(12) United States Patent
Groitzsch et al.

(10) Patent No.: US 8,363,211 B2
(45) Date of Patent: Jan. 29, 2013

(54) SENSOR DEVICE AND METHOD FOR DETECTING THE MOTION OF A VEHICLE

(75) Inventors: Stephan Groitzsch, Weinheim (DE); Wilfried Mehr, Wolfurt (AT); Bernhard Schmid, Friedberg (DE); Matthias Schorn, Mühltal (DE); Christian Gutmann, Weinheim (DE); Stefan Stözl, Weinheim (DE); Frank Steinmeier, Regensburg (DE); Artur Otto, Neu-Anspach (DE); Thomas Zuccaro, Bad Soden (DE)

(73) Assignees: Continental Teves AG & Co. oHG (DE); ADC Automotive Distance Controls Systems GmbH (DE); Continental Engineering Service GmbH (DE)

( * ) Notice: Subject to any disclaimer, the term of this patent is extended or adjusted under 35 U.S.C. 154(b) by 114 days.

(21) Appl. No.: 12/678,403

(22) PCT Filed: Sep. 17, 2008

(86) PCT No.: PCT/EP2008/062354
§ 371 (c)(1),
(2), (4) Date: Jul. 6, 2010

(87) PCT Pub. No.: WO2009/037278
PCT Pub. Date: Mar. 26, 2009

(65) Prior Publication Data
US 2010/0290030 A1    Nov. 18, 2010

(30) Foreign Application Priority Data

Sep. 18, 2007  (DE) .......................... 10 2007 044 722
Feb. 26, 2008  (DE) .......................... 10 2008 011 194
Mar. 26, 2008  (DE) .......................... 10 2008 015 863
Aug. 12, 2008  (DE) .......................... 10 2008 038 615

(51) Int. Cl.
*G01C 3/08* (2006.01)
(52) U.S. Cl. ........................................ 356/5.01; 356/5.1
(58) Field of Classification Search ................. 356/5.01, 356/28–28.5, 138–155
See application file for complete search history.

(56) References Cited

U.S. PATENT DOCUMENTS 3,711,200 A * 1/1973 Maughmer ..................... 356/28
4,635,059 A   1/1987 Ball
(Continued)

FOREIGN PATENT DOCUMENTS

DE    38 25 639       2/1990
DE    197 20 846     11/1998
(Continued)

OTHER PUBLICATIONS

International Search Report for PCT/EP2008/062354 issued Feb. 4, 2009.

(Continued)

*Primary Examiner* — Luke Ratcliffe
(74) *Attorney, Agent, or Firm* — RatnerPrestia

(57) ABSTRACT

A sensor device for detecting a motion state of a motor vehicle. The sensor device includes at least one laser unit having a light source for emitting coherent light which is transmitted in the direction of a roadway surface, and an interference detector which is designed to detect at least one measurement variable which characterizes interference between the light scattered at the surface and the light of the light source. The measurement variable represents a speed component of the sensor device and/or a distance between the sensor device and the roadway surface. The laser unit is coupled to an evaluation device which is designed to determine, from the measurement variable, at least one variable which characterizes the motion state of the vehicle, in particular a speed component of the center of gravity of the vehicle, a rotational angle or a rotation rate of the vehicle.

17 Claims, 9 Drawing Sheets

U.S. PATENT DOCUMENTS

| | | | |
|---|---|---|---|
| 6,157,294 | A | 12/2000 | Urai et al. |
| 6,230,107 | B1 | 5/2001 | Yamamoto et al. |
| 2004/0109155 | A1* | 6/2004 | Deines .................. 356/28.5 |
| 2004/0138802 | A1* | 7/2004 | Kuragaki et al. .............. 701/70 |
| 2004/0160595 | A1* | 8/2004 | Zivkovic et al. ................ 356/73 |
| 2007/0159381 | A1* | 7/2007 | Kojima et al. ................ 342/104 |
| 2008/0137062 | A1* | 6/2008 | Holton et al. .................. 356/28 |
| 2012/0089299 | A1* | 4/2012 | Breed ........................... 701/36 |

FOREIGN PATENT DOCUMENTS

| | | |
|---|---|---|
| DE | 10 2004 060 677 | 6/2006 |
| DE | 10 2006 042 766 | 3/2008 |
| EP | 1 494 045 | 1/2005 |
| JP | 07 120554 | 5/1995 |

OTHER PUBLICATIONS

German Search Report for DE 10 2008 038 615.4 dated Feb. 18, 2009.

M.H. Koelink et al., "Laser Doppler velocimeter based on the self-mixing effect in a fibre-coupled semiconductor laser: theory", Applied Optics, vol. 31, 1992, pp. 3401-3408.

\* cited by examiner

SENSOR DEVICE AND METHOD FOR DETECTING THE MOTION OF A VEHICLE

CROSS REFERENCE TO RELATED APPLICATIONS

This application is the U.S. national phase application of PCT International Application No. PCT/EP2008/062354, filed Sep. 17, 2008, which claims priority to German Patent Application No. DE 10 2007 044 722.3, filed Sep. 18, 2007, German Patent Application No. 10 2008 011 194.5, filed Feb. 26, 2008, German Patent Application No. 10 2008 015 863.1, filed Mar. 26, 2008, and German Patent Application No. 10 2008 038 615.4, filed Aug. 12, 2008, the contents of such applications being incorporated herein by reference.

FIELD OF THE INVENTION

The invention relates to the detection of a motion of a motor vehicle. The subject matter of the invention is, in particular, a sensor device for detecting the motion state of a motor vehicle. In addition, the invention relates to a method for detecting the motion state of a motor vehicle.

BACKGROUND OF THE INVENTION

The detection of motions of a motor vehicle is considered particularly significant in the automobile industry. Motion variables such as, for example, the longitudinal speed of a vehicle, constitute important information for the driver of the vehicle. In addition, motion variables serve as input signals for vehicle movement dynamics control systems with which the safety and comfort of the vehicle are improved. A conventional vehicle movement dynamics control system generally comprises in this context wheel speed sensors, from whose measured values the longitudinal speed of the vehicle is derived, and a sensor for detecting the yaw rate of the vehicle, and sensors for detecting the transverse acceleration and, if appropriate, the longitudinal acceleration.

DE 10 2004 060 677 A1, which is incorporated by reference, discloses an optical device for obtaining the speed of a motor vehicle, in which device images of the underlying surface of the vehicle are recorded in a sequence. The speed of the vehicle is obtained on the basis of displacement of objects or structural features within the images. In addition to the longitudinal speed, it is also possible to obtain the transverse speed of the motor vehicle in this context, the transverse speed frequently being inaccessible to measurement by means of the vehicle sensor system and constituting a useful input variable for vehicle movement dynamics control systems.

Such a device generally requires additional lighting of the roadway surface, as a result of which the expenditure on integration into a motor vehicle is increased. In addition, the device is relatively susceptible to soiling of the camera or of the lighting device, which occurs to a greater degree owing to the installation position on the underfloor of the motor vehicle. As a result, the availability of the device can be adversely affected. Furthermore, the device can only detect speed components in the plane of the roadway but not perpendicularly thereto.

SUMMARY OF THE INVENTION

An object of the present invention is therefore to permit improved detection of motions of a motor vehicle, permitting, in particular, more reliable detection of motion.

According to a first aspect of the invention, a sensor device for detecting a motion state of a motor vehicle is proposed. The sensor device comprises at least one laser unit which has a light source for emitting coherent light which is transmitted in the direction of a roadway surface when the sensor device is arranged on the motor vehicle, and which has an interference detector which is designed to detect at least one measurement variable which characterizes interference between the light scattered at the surface and the light of the light source. The measurement variable represents a speed component of the sensor device and/or a distance between the sensor device and the roadway surface. The laser unit is coupled to an evaluation device which is designed to determine, from the measurement variable, at least one variable which characterizes the motion state of the vehicle.

According to a second aspect of the invention, a method for detecting a motion state of a motor vehicle having a sensor device is proposed. The method provides that:
(a) coherent light is transmitted in the direction of a roadway surface from a light source of the sensor device,
(b) at least one measurement variable, which characterizes interference between the light scattered at the roadway surface and the light of the light source, is detected with an interference detector of the sensor device, wherein the measurement variable represents a speed component of the sensor device and/or a distance between the sensor device and the roadway surface, and
(c) at least one variable which characterizes the motion state of the vehicle is obtained in accordance with the measurement variable.

The invention permits contactless determination of the motion state of the motor vehicle. This permits the motion state of the vehicle to be determined reliably and independently of disruptive influences. In addition, the optical measurement method permits the variable which characterizes the motion state of the vehicle to be obtained very precisely.

The variable which characterizes the motion state of the vehicle may be, in particular, one or more speed components of the vehicle and/or one or more rotational angles of the vehicle. The latter can be determined on the basis of the distance between the sensor device and the roadway surface, said distance being the distance along the light beam measured by the sensor device. Furthermore, rotational angle speeds, in particular the yaw rate, pitching rate and/or rolling rate of the vehicle, can be determined. This can be done using detected speed components and/or by deriving corresponding rotational angles over time.

The light transmitted in the direction of the roadway surface by the light source is scattered back at least partially to the light source.

In order to achieve a compact and uncomplicated design of the sensor device, the location of the interference is therefore preferably the light source, in particular a laser resonator of the light source. Such interference leads to a change in the operating state of the laser which can be detected with a detector. This is also referred to as a self-mixing effect.

In one embodiment of the sensor device and of the method, the sensor device comprises at least one sensor cluster having a plurality of laser units which are coupled to the evaluation device, wherein the laser units emit light in various direction. The sensor cluster preferably comprises three laser units.

By means of the three laser units, which each transmit light in a specific direction, it is advantageously possible to determine three speed components of the sensor device and/or three distances between the sensor device and the roadway surface. On the basis of the three speed components it is possible, in particular, to determine the translatory speed of the sensor device in relation to the roadway in the three spatial directions. If in each case the distance from the roadway surface is obtained by means of the laser units, the position of the sensor device in relation to the roadway surface can be determined therefrom.

In a further embodiment of the sensor device and of the method, the laser units of the sensor cluster are arranged in a common housing which can be mounted on an underside of a bodywork of a vehicle, which underside faces the roadway surface when the motor vehicle is operating.

One advantage of this embodiment is that the laser units of the sensor cluster are arranged in a common housing, resulting in a compact and cost-effective design of the sensor cluster. In addition, the sensor cluster in this configuration can be mounted particularly easily on the vehicle since it is not necessary to attach and orient each laser unit individually.

One development of the sensor device and of the method is distinguished by the fact that the evaluation device is designed to obtain a speed component of the sensor cluster from each of the measurement variables detected by means of the laser units of the sensor cluster, and to determine at least one speed component of the motor vehicle on the basis of the obtained speed components.

The speed component of the motor vehicle may be a speed component of the center of gravity of the vehicle, which is particularly suitable for characterizing the vehicle movement dynamics state of the motor vehicle. In particular, the longitudinal speed of the vehicle and/or the transverse speed of the vehicle can be determined in relation to the center of gravity of the vehicle.

The motion at one point on the motor vehicle, in particular the motion of the sensor device, can be decomposed into the translational speed of the center of gravity of the vehicle and of a rotational motion of the respective point in relation to the center of gravity of the vehicle, which translational speed can be described by the rotation rates of the vehicle and/or of the vehicle bodywork. The rotation rates of the vehicle comprise a yaw rate, which characterizes the rotational speed about the vertical axis of the vehicle, a rolling rate, which characterizes a rotational speed about the longitudinal axis of the vehicle, and a pitching rate, which characterizes the rotational speed about the transverse axis of the vehicle. At least one rotation rate is preferably used to determine the speed of the center of gravity of the vehicle on the basis of the obtained speed components of the sensor cluster.

As a result, a configuration of the sensor device and of the method provides that the evaluation device is designed to use at least one rotational rate of the motor vehicle in the determination of the speed component of the motor vehicle.

One configuration of the invention which permits, in particular, at least one speed component of the motor vehicle to be obtained, includes the fact that the evaluation device is designed to determine at least one speed component of the motor vehicle and/or a second rotation rate from the measurement variable detected in the sensor clusters and the first rotation rate detected by means of the device.

In addition to the two sensor clusters, a device for determining a rotation rate is advantageously used here to obtain a component of the vehicle speed and/or a further rotation rate of the vehicle. As a result, the motion state of the motor vehicle including one or more speed components and at least two rotation rates can be determined with a relatively simple sensor configuration.

An associated configuration of the sensor device and of the method is distinguished by the fact that the device for determining the rotation rate is a rotation rate sensor, in particular a yaw rate sensor.

The rotation rate sensor is configured, for example, as a micromechanical rotation rate sensor. The yaw rate is a particularly important variable for characterizing the vehicle movement dynamics state of the motor vehicle, in particular with regard to the stability of the driving state. For this reason, in this configuration the yaw rate is measured directly, while in particular a further rotation rate, such as for example the rolling rate, can be calculated from the obtained measurement variables.

In a further embodiment of the sensor device and of the method, an additional sensor, which detects a measurement variable according to another measurement principle, is dispensed with. In this embodiment, the sensor device comprises three sensor clusters which are coupled to the evaluation device, wherein the evaluation device is designed to determine, from the measurement variables obtained with the three sensor clusters, at least one speed component of the motor vehicle and/or at least one rotation rate of the vehicle.

In addition, one configuration of the sensor device and of the method comprises a first sensor cluster having a plurality of laser units—in particular three thereof—wherein the frequencies of the light emitted by the laser units can be modulated according to a modulation schema in such a way that in each case a distance can be obtained from the detected measurement variable in the evaluation device, wherein the evaluation device is designed to determine at least one rotational angle and/or at least one rotation rate of the vehicle from the obtained distances.

This configuration advantageously makes use of the possibility of determining, from the distances obtained by means of the laser units of the first sensor cluster, the position of the sensor cluster in relation to the roadway and/or a rotational angle of the vehicle bodywork in relation to the roadway. In addition, the corresponding rotation rate, which can likewise be determined in this configuration can also be calculated from the rotational angle. The calculation of the rotation rate is carried out, in particular, by deriving the rotational angle over time.

An associated configuration of the sensor device and of the method is defined in that the frequencies of the light emitted by the laser units can be modulated according to a modulation schema in such a way that, in addition to the distance, in each case a speed component of the first sensor cluster can be obtained from the detected measurement variable.

One advantage of this configuration is that, in addition to the distances between the sensor cluster and the roadway surface, it is also possible to obtain speed components of the sensor device in relation to the roadway surface. This can be done by means of a suitable modulation schema.

A further associated configuration of the sensor device and of the method includes the fact that the evaluation device is designed to determine at least one speed component of the motor vehicle from the speed components obtained with the first sensor cluster and the rotation rate.

The precision when determining the speed of the center of gravity can be improved by taking into account at least one further rotation rate. For this reason, in one embodiment of the sensor device and of the method there is provision that the evaluation device is designed to use, for obtaining the speed component of the motor vehicle, a further rotation rate which is obtained by means of a rotation rate sensor.

The rotation rate may advantageously be, in particular, the yaw rate of the vehicle. The rotation rate sensor is configured in this case as a yaw rate sensor.

One alternative configuration dispenses with the use of an additional rotation rate sensor which operates according to another measurement principle than the laser units of the sensor device. This configuration comprises a second sensor cluster which is connected to the evaluation device, wherein speed components of the second sensor cluster can be obtained from the measurement variable detected in the second sensor cluster, wherein the evaluation device is designed to obtain at least one further rotation rate of the vehicle from the obtained speed components of the first and second sensor clusters, and to use the further rotation rate to obtain the speed component of the motor vehicle.

The preceding presentation of the sensor device reveals that it is suitable, in particular, for use in a motor vehicle. In addition to the sensor device, the invention also makes available a motor vehicle which comprises a sensor device of the previously described type.

The previously mentioned advantages, particularities and expedient developments of the invention, and further advantages, particularities and expedient developments of the invention, also become clear on the basis of exemplary embodiments which are described below with reference to the figures.

DETAILED DESCRIPTION OF THE PREFERRED EMBODIMENTS

Figure 1:
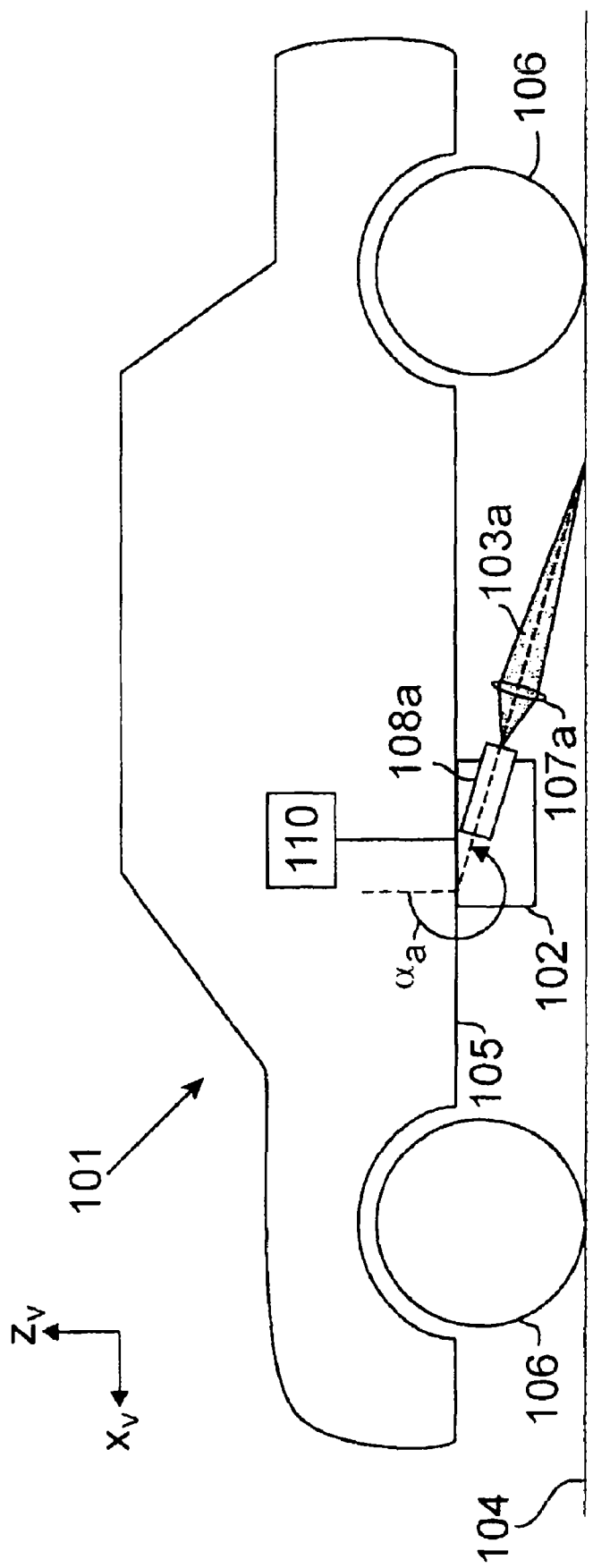
FIG. 1 is a schematic illustration of a motor vehicle having a sensor device according to aspects of the invention in a vertical section.
Figure 2:
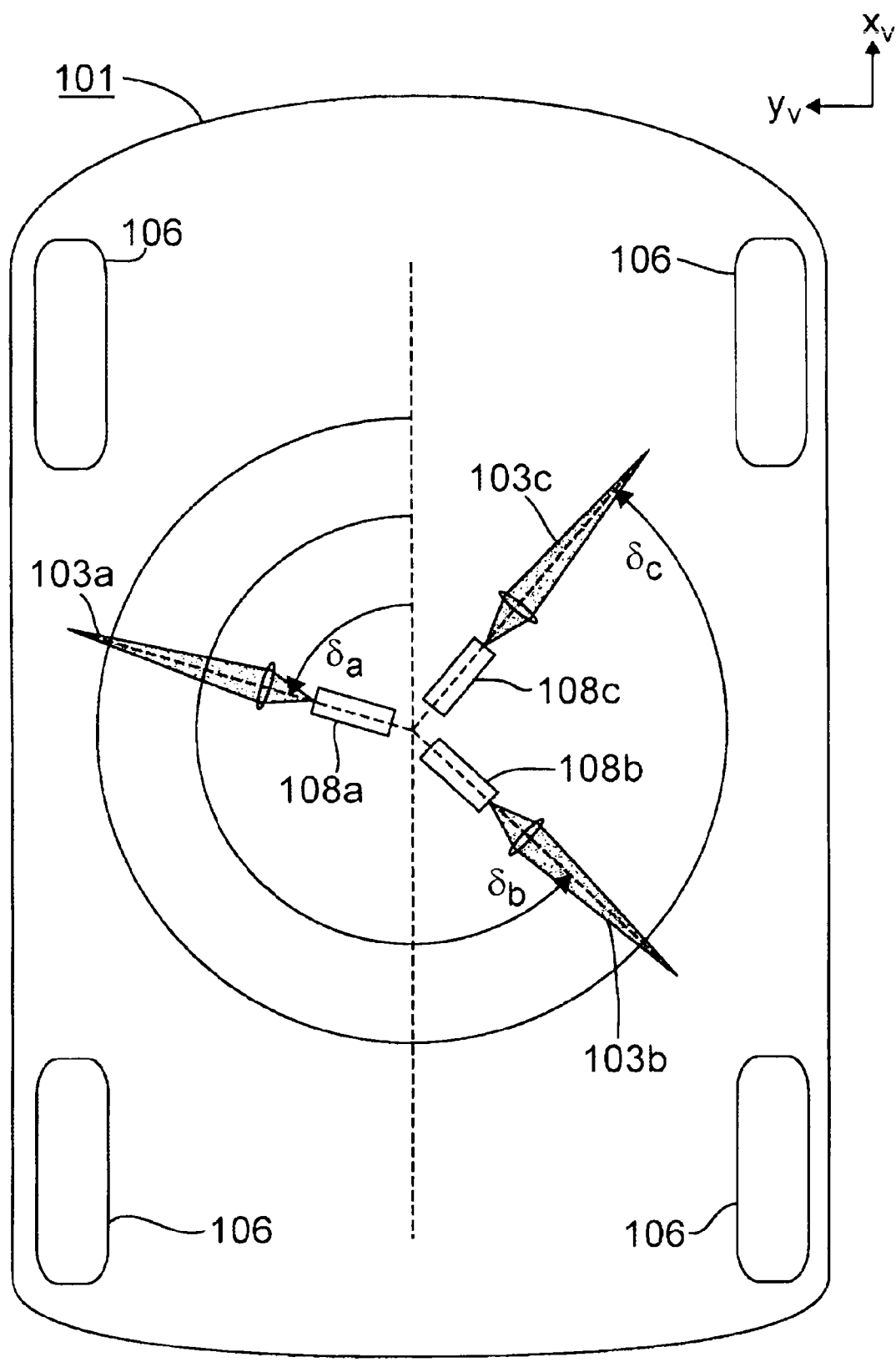
FIG. 2 is a schematic illustration of a motor vehicle having a sensor device according to aspects of the invention, in a horizontal section.

FIG. 1 shows, in a schematic illustration, a motor vehicle 101 which is equipped with a sensor cluster 102 which is connected to an evaluation device 110 which is arranged in the vehicle 101. The motor vehicle 101 comprises a bodywork 105 and wheels 106. The motor vehicle 101 may be, for example, a passenger car or a truck with any desired number of axles and wheels 106. To this extent, the illustration in the figure is to be understood as being purely exemplary. The evaluation device 110 is an electronic computational unit which has a microprocessor for carrying out calculations and a non-volatile memory in which algorithms and parameters for carrying out the calculations are stored. The sensor cluster 102 is arranged on the underfloor of the bodywork 105 and comprises three laser units 108a, b, c, only one laser unit 108a of which is illustrated in FIG. 1. Each laser unit 108a, b, c transmits a measuring light beam 103 a, b, c at an angle $\alpha_i$ (i=a, b, c) with respect to the underfloor of the vehicle 101 in the direction of the roadway surface 104. An optical element 107a, b, c bundles the measuring light beam 103a, b, c and focuses it on a point on the roadway 104 or on a point in the vicinity of the roadway surface 104. The measuring light beam 103a, b, c of a laser unit 108a, b, c is formed by coherent light and generated, for example, in a semiconductor laser which can be configured in one configuration, as Vertical Cavity Surface Emitting Laser (VCSEL). The light is preferably in an invisible spectral range, in particular in the infrared spectral range, so that the measuring light beams 103a, b, c cannot be seen and cannot distract road users. However, it is also alternatively possible to generate light in another spectral range. The laser units 108a, b, c of the sensor cluster 102 are arranged in such a way that their measuring light beams 103a, b, c have different directions. In one exemplary configuration, the measuring light beams 103a, b, c enclose the same angle $\alpha_i$ with the underfloor of the vehicle, however their projections onto the underfloor of the vehicle have different angles $\delta_i$ with respect to the longitudinal direction of the vehicle, as is schematically illustrated in FIG. 2, however, other configurations are of course also possible.

Figure 3:
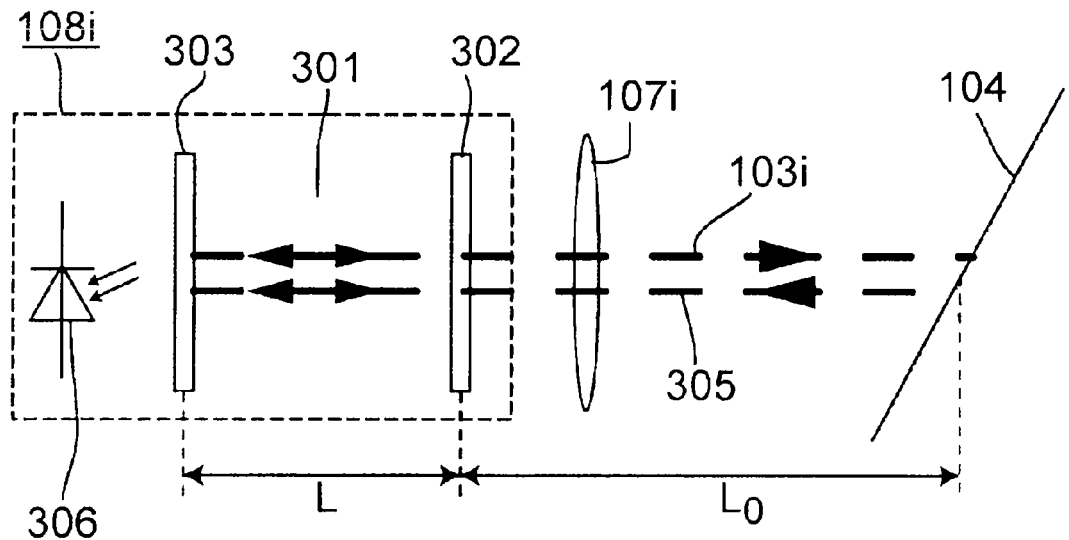
FIG. 3 is a schematic illustration showing the functional principle of a sensor device according to aspects of the invention.

The basic method of functioning of the laser units 108a, b, c is illustrated by way of example on the basis of FIG. 3 for a laser unit 108i, which serves as an example for all the laser units 108a, b, c of the sensor cluster 102. The laser unit 108i comprises a resonator 301 of the length L, which is bounded by a front translucent mirror 302 and a rear translucent mirror 303. The measuring light beam 103i is formed by light which emerges from the resonator 301 in the direction of the roadway surface 104 through the front mirror 302. The length of the path which the measuring light beam 103 travels along between the resonator 301 or the front mirror 302 and the roadway surface 104 is denoted here by $L_0$. The measuring light beam 103 is scattered at the roadway surface 104. Part of the scattered light is reflected back as a scattered light beam 305 in the opposite directions to the measuring light beam 103i. As a result of the optical devices 107i the scattered light beam 305 passes into the resonator 301 and interferes there with the light amplified in the resonator 301.

If the resonator 301 and the roadway surface 104 move with a speed component $v_{Li}$ relative to one another in the direction of the measuring light beam 103 owing to a movement of the vehicle 101, the scattered light beam 305 experiences a Doppler shift. This is a change in the frequency of the light or of the wavelength as a function of the specified speed component $v_{Li}$. Owing to the feeding back of the scattered light beam 305 into the resonator 301, a self-mixing effect occurs within the resonator 301. This means that the laser amplification is modulated with a frequency which depends on the Doppler shift of the scattered light beam 305, and therefore also on the described speed component. The change $\Delta g$ in the laser amplification over time is described as a function of the speed component $v_{Li}$ of the relative motion between the resonator 301 and the roadway surface 104 in the direction of the measuring light beam 103i by means of the following equation:

$$\Delta g = -\frac{\kappa}{L} \cdot \cos(4 \cdot \pi \cdot f_0 \cdot v_{Li} \cdot t/c + 4 \cdot \pi \cdot L_0 \cdot f_0/c) \tag{1}$$

Here, κ denotes a laser-specific coupling coefficient which has a value between zero and one, $f_0$ represents the frequency of the light emitted from the laser unit 108i, c represents the speed of light, and t represents time. Equation (1) is obtained, for example, from the theory of the Self-Mixing Effect in M. H. Koelink et al., "Laser Doppler velocimeter based on the self-mixing effect in a fibre-coupled semiconductor laser: theory", Applied Optics, Vol. 31, 1992, pages 3401-3408, which is incorporated by reference.

The periodic modulation of the laser amplification leads to corresponding periodic modulation of the intensity of the light emitted by the resonator 301. The speed component $v_{Li}$ can be obtained from the frequency with which the measured intensity periodically changes. In order to measure the intensity of the light emitted by the resonator 301, the photo diode 306 is provided, said photo diode 306 detecting light which emerges from the resonator 301 through the rear mirror 303. Such a diode 306 is generally used to keep the intensity of the laser light constant or control it and is therefore generally already a component of the equipment of commercially available laser diodes. In the present application, the photo diode 306 is connected to the evaluation device 110 which obtains the frequency of the changes in intensity from the time profile of the measured intensity and determines the speed component $v_{Li}$ on the basis of this frequency.

Figure 4:
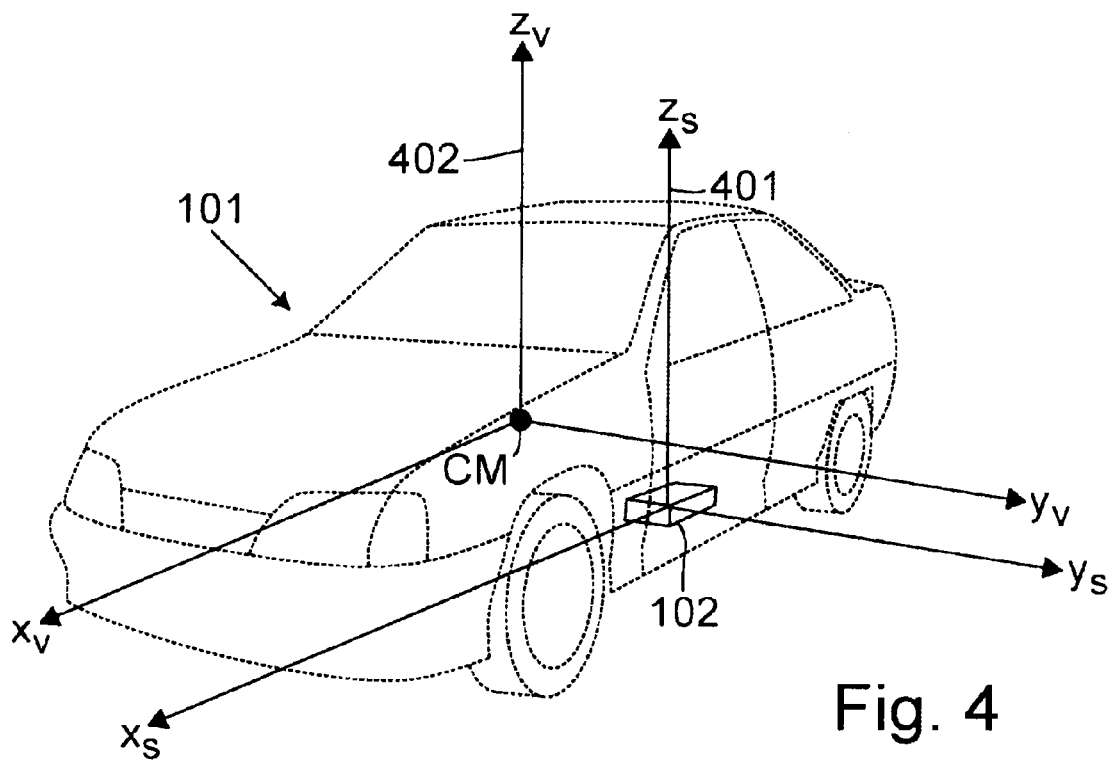
FIG. 4 is a schematic illustration of the position of various coordinate systems in relation to the vehicle.

By means of the three laser units 108a, b, c of the sensor cluster 102 it is therefore possible to obtain three speed components $v_{Li}$ (i=a, b, c) which are evaluated by the evaluation device 110. For the evaluation which is to be performed, it is favorable to consider a sensor coordinate system 401 which is illustrated in FIG. 4. The sensor coordinate system 401 is a rectangular coordinate system whose origin coincides with the mounting location of the sensor cluster 102 at a measuring time. The sensor coordinate system 401 is therefore a spatially-fixed coordinate system which is initialized fixed to the vehicle at the measuring time. For example, the $x_s$-axis of the sensor coordinate system points forward in the longitudinal direction of the vehicle, the $y_s$ axis points to the left in the transverse direction of the vehicle and the $z_s$ axis points upward in the vertical direction of the vehicle. Other orientations of the sensor coordinate system 401 are, however, likewise possible. In addition to the sensor coordinate system 401, FIG. 4 additionally illustrates the center of gravity system 402 of the vehicle 101, the origin of which center of gravity system 402 is initialized at the measuring time in the center of gravity CM of the vehicle. As in the case of the sensor coordinate system 401, the $x_V$ axis of the center of gravity system 402 points forward in the longitudinal direction of the vehicle, the $y_V$-axis points to the left in the transverse direction of the vehicle, and the $z_V$-axis points upward in the vertical direction of the vehicle. The center of gravity system 402 is therefore shifted and rotated with respect to the sensor coordinate system 401, along the connecting line between the sensor cluster 102 and the center of gravity CM of the vehicle.

In the sensor coordinate system 401, the directions $\vec{n}_i$ of the measuring light beams 103a, b, c of the sensor cluster 102 are specified by the angles $\alpha_i$ and $\delta_i$ which are obtained from the fixed installation position of the sensor cluster 102 and can be stored as parameters in the non-volatile memory of the evaluation device 110 and are illustrated in FIGS. 1 and 2. The same applies to the directions:

$$\vec{n}_i = \begin{pmatrix} \sin\alpha_i \cdot \cos\delta_i \\ \sin\alpha_i \cdot \sin\delta_i \\ \cos\delta_i \end{pmatrix} (i = a, b, c) \quad (2)$$

The speed components measured by means of the sensor cluster 102 correspond to the components of the speed $\vec{v}$ of the sensor cluster 102 in these directions i.e. using the scalar product, the following applies $$v_{Li} = \vec{v} \cdot \vec{n}_i (i=a,b,c) \quad (3)$$

A linear equation system, from which the components of the speed vector $\vec{v} = (v_x, v_y, v_z)$ along the three axes of the sensor coordinate system 401 can be obtained from the corresponding equations for the three speed components $v_{La}, v_{Lb}$ and $v_{Lc}$, which can be obtained with the laser units 108a, b, c of the sensor cluster 102. Said components correspond to the components of the speed of the sensor cluster 102 in the center of gravity system 402 since the latter is merely shifted and rotated with respect to the sensor coordinate system 401. The evaluation device 110 obtains the translational speed $v_{CM}$ of the center of gravity CM of the vehicle related to the sensor coordinate system 401 and/or to the center of gravity system 402, from the speed $\vec{v}$. This is done using the relationship which is known per se:

$$\vec{v} = \vec{v}_{CM} - \vec{\omega} \times \vec{x} \quad (4)$$

Here, $\vec{x}$ denotes the connecting vector starting from the sensor cluster 102 to the center of gravity CM of the vehicle. In order to enable the evaluation device 110 to calculate the speed $\vec{v}_{CM}$ of the center of gravity, the components of the connecting vector $\vec{x}$ between the sensor cluster 102 and the center of gravity CM of the vehicle are stored in one embodiment as parameters in the non-volatile memory of the evaluation device 110 after they have been previously determined for a typical load state of the vehicle 101. Changes in the position of the center of gravity CM due to changed loading are ignored in this configuration. The variable $\vec{\omega} = [d\phi/dt, d\theta/dt, d\psi/dt]$ which is contained in equation (4) denotes the angular speed of the vehicle 101, the components of which are the rolling rate $d\phi/dt$ of the vehicle 101, the pitching rate $d\theta/dt$ of the vehicle 101 and the yaw rate $d\psi/dt$ of the vehicle 101.

Since the sensor coordinate system 401 and the center of gravity system 402 are initialized fixed to the vehicle, the xy-planes of these systems are rotated about the current pitching angle and rolling angle due to rolling motions and pitching motions of the vehicle bodywork 105 with respect to the roadway surface 104. However, the vehicle movement dynamics state of the vehicle 101 is usually characterized by speed components, in particular a longitudinal speed $v_{CM,x}^h$ and a transverse speed $v_{CM,y}^h$ of the vehicle which are related to a horizontal system. This involves a coordinate system whose x-y plane runs parallel to the plane of the roadway or lies in the plane of the roadway. A horizontalized system whose origin is initialized perpendicularly below the center of gravity CM of the vehicle 101 in the plane of the roadway at the time of consideration is generally used. The x axis runs forward in the plane of the roadway in the longitudinal direction of the vehicle, the y axis runs to the left in the plane 104 of the roadway in the transverse direction of the vehicle, and the z axis runs upward perpendicularly with respect to the surface 104 of the roadway in the vertical direction of the vehicle. Between the speed $\vec{v}_{CM}$ of the center of gravity related to the center of gravity system 402 and the center of gravity speed $\vec{v}_{CM}^{h}=(v_{CM,x}^{h}, v_{CM,y}^{h}, v_{CM,z}^{h})$ related to the horizontalized system there is the following relationship $$\vec{v}_{CM}=S_y(\theta)S_x(\phi)\vec{v}_{CM}^{h} \text{ or } \vec{v}_{CM}^{h}=S_y(-\theta)S_x(-\phi)\vec{v}_{CM} \qquad (5)$$

Here, the matrix $S_y(\theta)$ describes a rotation about the instantaneous y axis through the pitching angle θ, and the matrix $S_x(\phi)$ denotes a rotation about the instantaneous x axis through the rolling angle φ, and the following applies:

$$S_x(\phi)=\begin{pmatrix} 1 & 0 & 0 \\ 0 & \cos\phi & \sin\phi \\ 0 & -\sin\phi & \cos\phi \end{pmatrix} S_y(\theta)=\begin{pmatrix} \cos\theta & 0 & -\sin\theta \\ 0 & 1 & 0 \\ \sin\theta & 0 & \cos\theta \end{pmatrix} \qquad (6)$$

In order to determine the speed $\vec{v}_{CM}$ of the center of gravity in the center of gravity system 402, the knowledge of the rotation rates of the vehicle 101, i.e. the yaw rate, the rolling rate and the pitching rate, is therefore necessary, and furthermore knowledge of the rolling angle and of the pitching angle of the vehicle 101 are necessary to obtain the speed of the center of gravity in the horizontalized system $\vec{v}_{CM}^{h}$.

Figure 5:
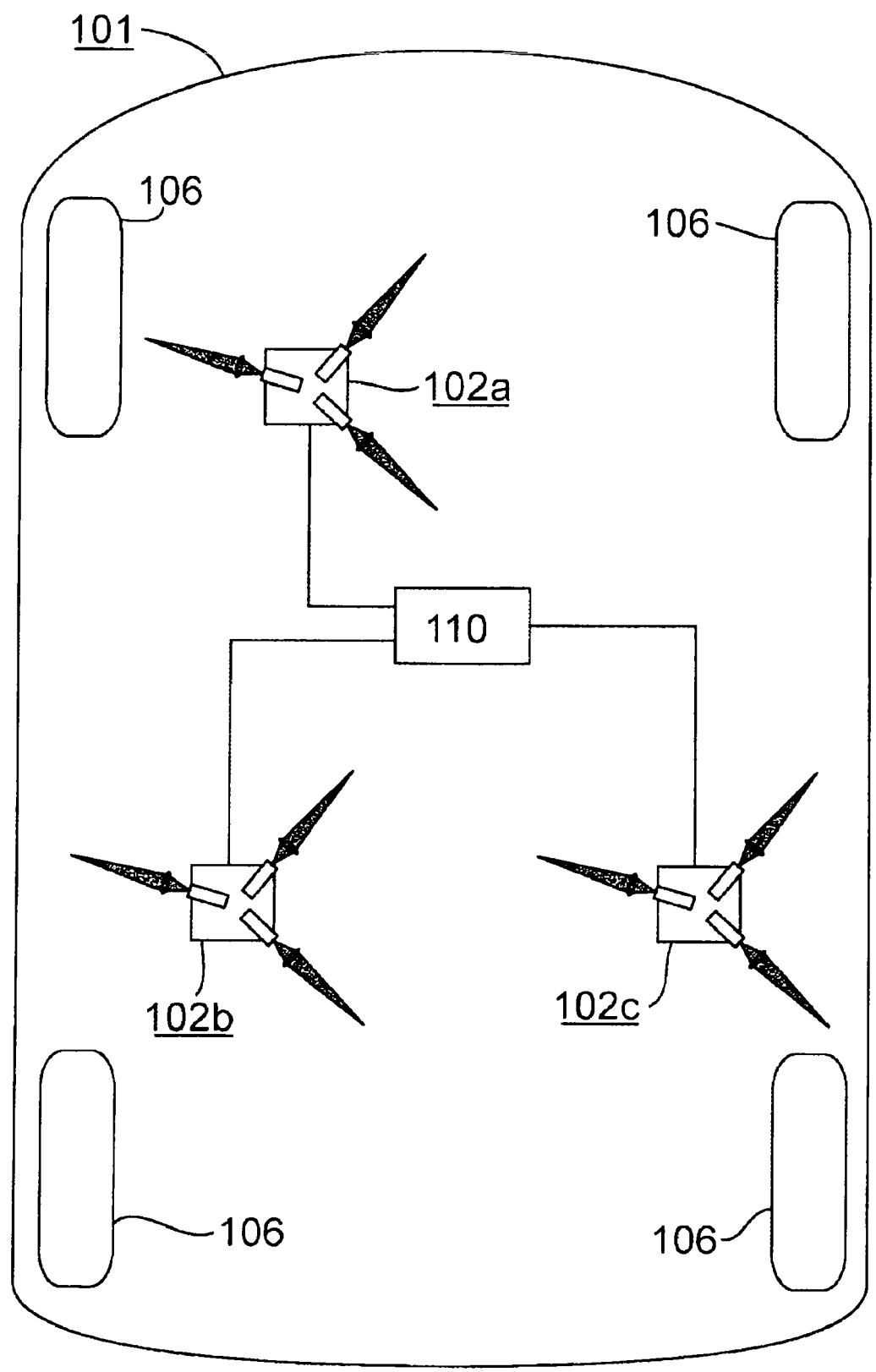
FIG. 5 is a schematic illustration of a motor vehicle having three sensor clusters in a horizontal section.

In order to determine the motion of the vehicle in accordance with its three translatory and three rotational degrees of freedom, in one embodiment—illustrated schematically in FIG. 5 by means of a block diagram—three sensor clusters 102a, b, c of the previously described type, which are connected to the evaluation device 110, are used. The sensor clusters 102a, b, c are arranged on the underfloor of the vehicle 101. The arrangement is also selected in such a way that the sensor clusters 102 a, b, c are not arranged in a straight line and preferably not in a plane. For each sensor cluster 102a, b, c it is possible, as previously described, to obtain, in the evaluation device 110, the speed $\vec{v}_i$ (i=a, b, c) of the sensor cluster 102 related to the center of gravity system 402. From the comparison of the speeds $\vec{v}_i$ with one another, the evaluation device 110 then determines the rolling rate, the pitching rate and the yaw rate of the vehicle 101. For the comparison of two speeds $\vec{v}_i$, the following equation applies, which equation is used for the evaluation and can be obtained, for example, from equation (4):

$$\vec{v}_i - \vec{v}_j = \vec{\omega} \times \vec{r}_{ij} (i,j=a,b,c) \qquad (7)$$

Here, $\vec{r}_{ij}=\vec{r}_i-\vec{r}_j$ denotes the connecting vector between the sensor cluster i and the sensor cluster j. For the pairs (i,j)=(a,b),(a,c),(b,c) equation (7) leads to three vector equations. These correspond to an equation system with 9 equations, from which three equations are selected and are used by the evaluation device 110 as the basis for obtaining the rotation rates of the vehicle 101. The rotation rates are then used by the evaluation device 110 to determine the centre of gravity speed $\vec{v}_{CM}$ of the vehicle 101 in the center of gravity system 402. This is done on the basis of equation (4) using the speed $\vec{v}_i$ (i=a,b,c) which is obtained for a sensor cluster 102 a, b, c. Alternatively, initially two or three values can also be determined for the center of gravity speed $\vec{v}_{CM}$ using the speed $\vec{v}_i$, which is obtained for the further sensor clusters 102 a, b, c and the speed $v_{CM}$ of the center of gravity can be derived from the individual values. This increases the accuracy of the determination of speed and permits plausibility checking, during which the three obtained values are compared with one another in order to detect a faulty measurement when the distances are too large.

Furthermore, integration of the rolling rate and of the pitch rate over time allows the rolling angle and the pitching angle to be obtained. The integration can begin, for example, at an ignition start which is signaled to the evaluation device 110, and can be carried out on the basis of the preconditions that the rolling angle and pitching angle have the value zero at the ignition start. In this configuration, by using the rolling angle and the pitching angle, the evaluation device 110 determines, on the basis of equation (5), the longitudinal speed $\vec{v}_{CM,x}^{h}$ of the vehicle and the transverse speed $\vec{v}_{CM,y}^{h}$ of the vehicle as well as, if appropriate, the vertical speed $\vec{v}_{CM,z}^{h}$ of the center of gravity CM of the vehicle in the horizontalized system.

Output signals of the evaluation device 110 which is connected to the three sensor clusters 102 a, b, c are, for example, the components of the translational speed $\vec{v}_{CM}$ of the center of gravity of the vehicle in the center of gravity system 402 which constitute good approximation values for the translational speed $\vec{v}_{CM}^{h}$ in the horizontalized system during the small rolling motions and pitching motions of the vehicle 101. If there is provision for the rotational angles of the vehicle 101 to be determined by integration of the rotation rates, the speed $\vec{v}_{CM}^{h}$ can also be output as an output variable by the evaluation device 110 in the horizontalized system. Further output variables represent the three obtained rotation rates of the vehicle 101.

Figure 6:
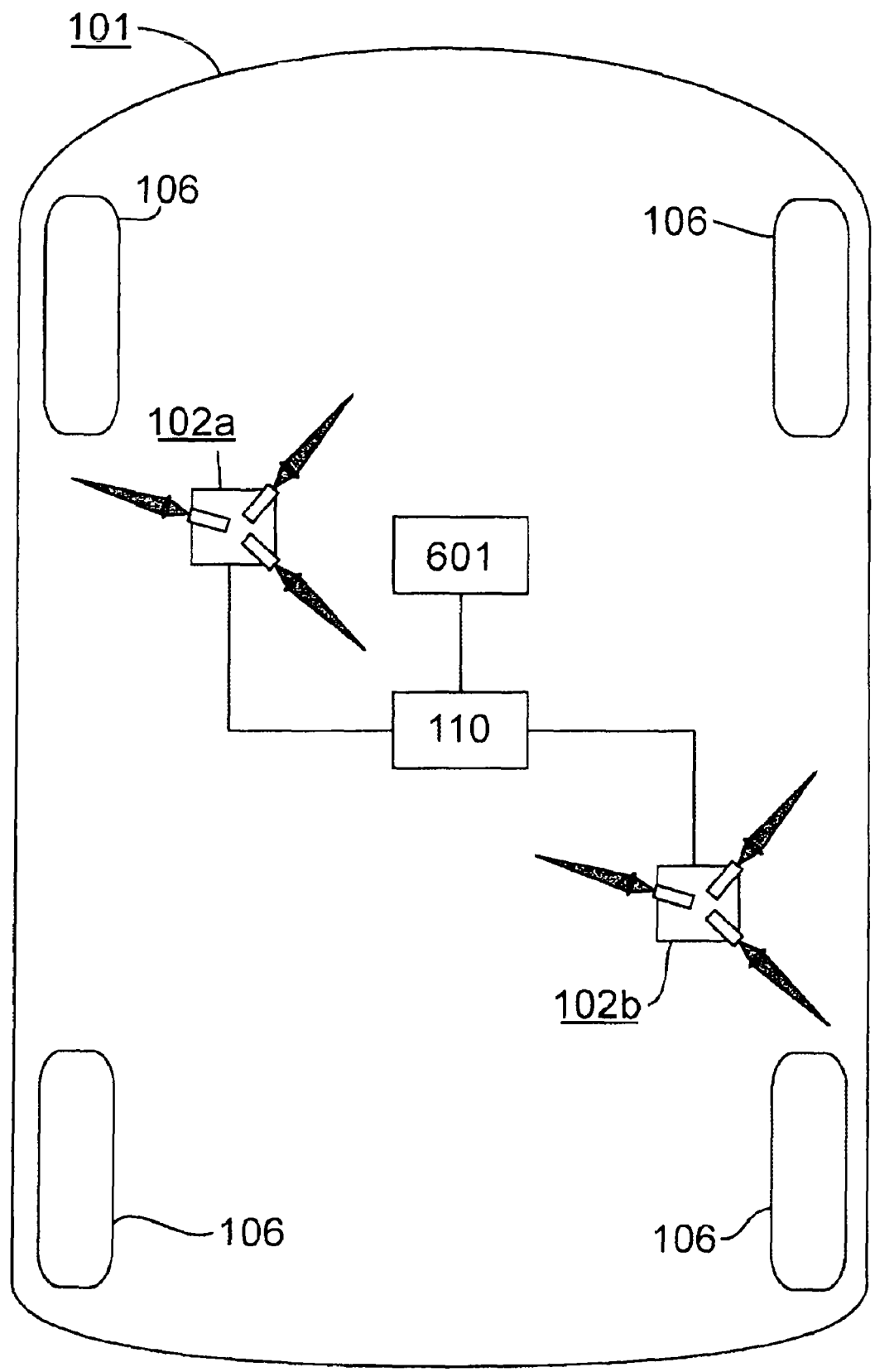
FIG. 6 is a schematic illustration of a motor vehicle having two sensor clusters in a horizontal section.

A further embodiment which is illustrated schematically in FIG. 6 differs from the previously described configuration in that, instead of three sensor clusters 102 a, b, c only two sensor clusters 102 a, b are used, said sensor clusters 102 a, b being mounted spaced apart from one another on the underfloor of the vehicle bodywork 105. However, in addition a rotation rate sensor 601 is provided whose measurement signals are fed to the evaluation device 110 in addition to the measurement signals of the sensor clusters 102 a, b, so that a rotation rate of the vehicle 101 is measured directly. In this configuration, the rotation rates which are not measured directly are determined from the speeds $\vec{v}_a$ and $\vec{v}_b$ which are obtained for the sensor clusters 102 a, b, which are determined in the evaluation device 110 in the previously described way, and from the measured rotation rate. In this context, according to equation (5), the relationship $\vec{v}_a - \vec{v}_b = \vec{\omega} \times \vec{r}_{dist}$ is used for the difference between the speeds $\vec{v}_a$ and $\vec{v}_b$ related to the center of gravity system 402. This vector equation comprises three equations, two of which are used to determine the rotation rates which are not measured by means of the rotation rate sensor 601. After the remaining rotation rates have been calculated, the evaluation device 110 determines, on the basis of the speeds $\vec{v}_a$ and $\vec{v}_b$ obtained for a sensor cluster 102 a, b or both sensor clusters 102 a, b, the translational speed $\vec{v}_{CM}$ of the center of gravity CM of the vehicle related to the center of gravity system 402, in analogous fashion to the configuration described above with reference to FIG. 5. As in this configuration, the rolling angle and pitching angle of the vehicle 101 can also be determined by integration of the rolling rate and the pitching rate over time.

The rotation rate sensor 601 is preferably a yaw rate sensor, since the yaw rate has the greatest influence on the vehicle movement dynamics, and direct measurement of the yaw rate independently of other variables is therefore advantageous. In addition, the yaw rate generally serves as an input variable of vehicle movement dynamics control systems, so that it is also advantageous in this respect to measure this variable directly. However, instead of the yaw rate sensor, it is also possible to use a rolling rate sensor or a pitching rate sensor. The rotation rate sensor used can be configured in a manner which is known per se to a person skilled in the art, in particular as a micromechanical rotation rate sensor which is known per se.

Output signals of the evaluation device 110 are in this configuration, for example, the components of the translational speed $\vec{v}_{CM}$ of the center of gravity of the vehicle in the center of gravity system 402 or—if there is provision for the rotational angles of the vehicle 101 to be determined by integration of the rotation rates—the translational speed $\vec{v}_{CM}^{h}$ in the horizontalized system. Further output variables are the two rotation rates of the vehicle 101, which are not measured directly by means of the rotation rate sensor 601. When a yaw rate sensor is used, these are the rolling rate and the pitching rate of the vehicle 101.

Figure 6A:
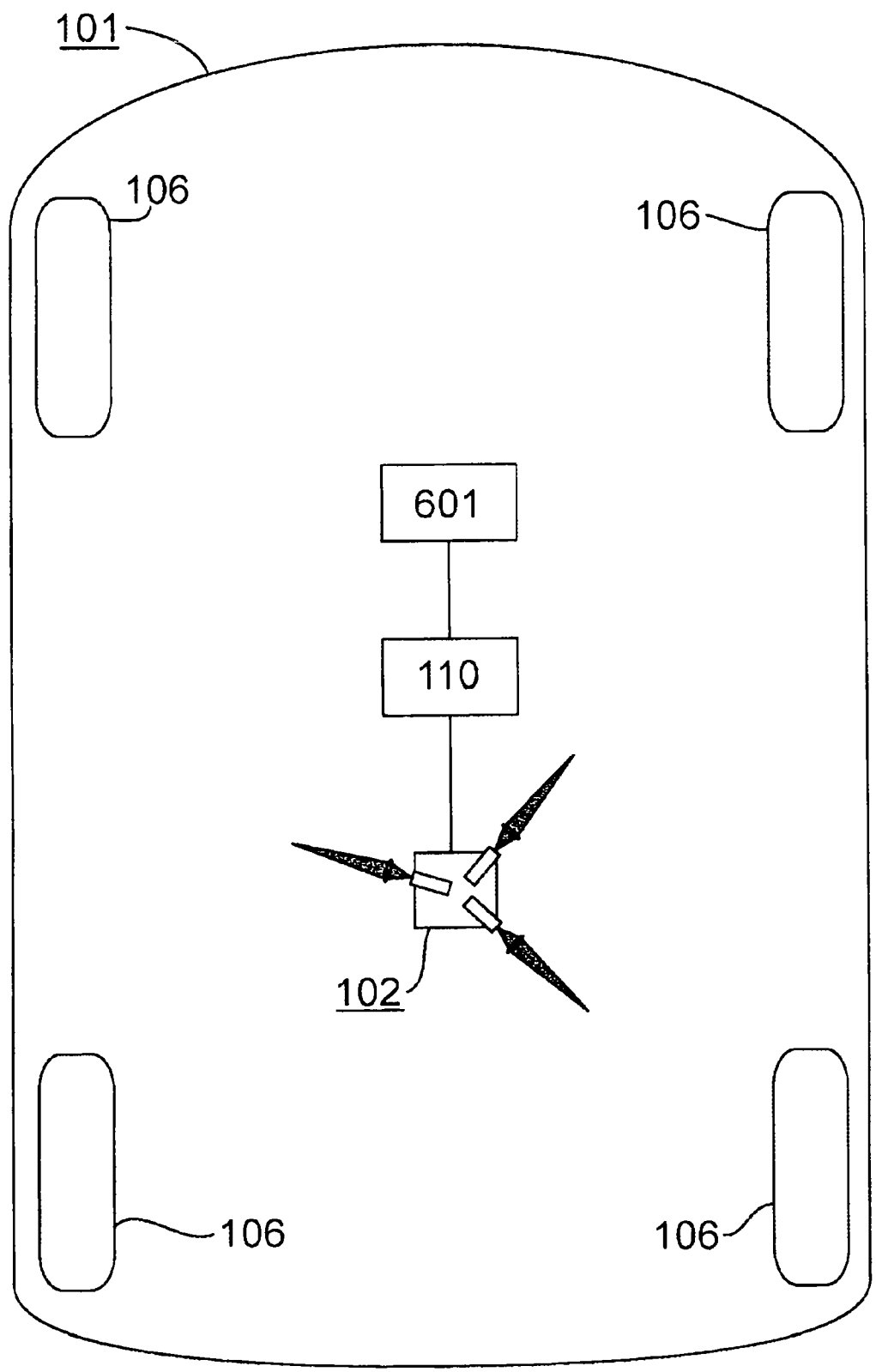
FIG. 6a is a schematic illustration of a motor vehicle having a sensor cluster in a horizontal section.

Ignoring the rolling motions and pitching motions of the vehicle 101, it is also possible to use a sensor configuration of a speed cluster 102 and a rotation rate sensor 601 in order to determine the previously mentioned variables approximately. This sensor configuration is illustrated schematically in FIG. 6a. The rotation rate sensor 601 is preferably a yaw rate sensor, for the reasons previously mentioned above.

As long as the vehicle 101 is subjected at most to small longitudinal and transverse accelerations, the rolling and pitching motions of the vehicle 101 are small. In a further configuration, there may therefore be provision for the rolling motions and pitching motions of the vehicle bodywork 105 to be ignored owing to spring compression, so that the rolling angle and pitching angle as well as the rolling rate and pitching rate of the vehicle 101 can be set to the value zero. In this configuration, the motor vehicle 101 is equipped with a sensor cluster 102 and a yaw rate sensor whose measurement signals are fed as input signals to the evaluation device in addition to the measurement signals of the sensor cluster 102. From the measurement signals of the sensor cluster 102, the evaluation device 110 determines here the speed $\vec{v}$ of the sensor cluster. An approximation value of the translational speed $v_{CM}$ of the center of gravity CM of the vehicle is then obtained using the yaw rate $d\psi/dt$. This is done according to the relationship $$\vec{v}_{CM} = \vec{v} + \begin{pmatrix} \frac{d\psi}{dt} \cdot y \\ -\frac{d\psi}{dt} \cdot x \\ 0 \end{pmatrix} \quad (8)$$

which is acquired from equation (4) by ignoring the rolling rate and pitching rate of the vehicle 101. The variable x denotes here the x component of the vector $\vec{x}$ in the sensor coordinate system 401, i.e. the distance of the center of gravity CM of the vehicle, measured in the longitudinal direction of the vehicle, from the sensor cluster 102, the variable y denotes the y components of the vector $\vec{x}$ in the sensor coordinate system 401, i.e. the distance of the center of gravity CM of the vehicle, measured in the transverse direction of the vehicle, from the sensor cluster 102. The output signals of the evaluation device 110 comprise, in this configuration, the components of the approximated translational speed $v_{CM}$ of the center of gravity CM of the vehicle in the center of gravity system 402, which can be used at the same time as approximation values for the components of the speed $\vec{v}_{CM}^{h}$ of the center of gravity in the horizontalized system.

In one configuration, the sensor cluster 102 can also be positioned at the center of gravity CM of the vehicle 101 or perpendicularly below the center of gravity CM of the vehicle 101. In this case, the translatory speeds can be measured directly by ignoring the rolling motions and pitching motions of the vehicle 101, and it is no longer necessary to take into account any rotational components.

Likewise, the vehicle 101 can be equipped, in addition to the yaw rate sensor, with a rolling rate sensor and/or with a pitching rate sensor so that, in addition to the yaw rate, further rotation rates can be measured and taken into account in the calculation of the translational speed $\vec{v}_{CM}$ of the center of gravity CM of the vehicle. By integrating the measured rotation rates over time, it is also possible to obtain the corresponding rotational angles and use them to determine the vehicle speed $\vec{v}_{CM}^{h}$ the horizontalized system from the speed $\vec{v}_{CM}$ in the center of gravity system 402, so that the components of the vehicle speed $\vec{v}_{CM}^{h}$ can be output in the horizontalized system by the evaluation device 110.

In further embodiments, a sensor cluster 102 of the previously described type is also used. In addition, a device is provided with which rolling angles and pitching angles of the vehicle bodywork 105 are determined. In order to obtain the rolling angle and the pitching angle, it is possible here to provide, in particular, travel sensors on spring elements of a chassis of the vehicle 101, which spring elements support the vehicle bodywork 105 with respect to the wheels 106. The travel sensors are each assigned here to a spring element and they measure the distance of spring travel which the bodywork 105 executes at the corresponding spring element. In the case of a four-wheeled vehicle 101, at least three travel sensors are provided at, in each case one vehicle wheel 106 in order to determine the specified variables in a manner known to a person skilled in the art. A fourth travel sensor permits the variables to be obtained in a redundant way, so that more precise determination is possible. From the spring travel values measured by the travel sensors, the evaluation device 110, to which the measurement signals of the travel sensors are fed, obtains the pitching angle and the rolling angle of the vehicle 101. In addition, the rolling rate and the pitching rate of the vehicle 101 can be obtained in the evaluation device 110 by deriving the rolling angle and the pitching angle over time. Said rolling rate and pitching rate are then used to determine, from the obtained speed $\vec{v}$ of the sensor cluster 102 the translational speed $\vec{v}_{CM}$ of the center of gravity CM of the vehicle using the relationship (4). On the basis of the obtained rolling angle and the obtained pitching angle the vehicle speed $\vec{v}_{CM}^{h}$ can be calculated in the horizontalized system. Output signals of the evaluation device 110 therefore represent the components of the vehicle speed $\vec{v}_{CM}^{h}$ in the horizontalized system, the rotation rates of the vehicle 101 and, if appropriate, the rotational angles of the vehicle 101 in this configuration.

Figure 7:
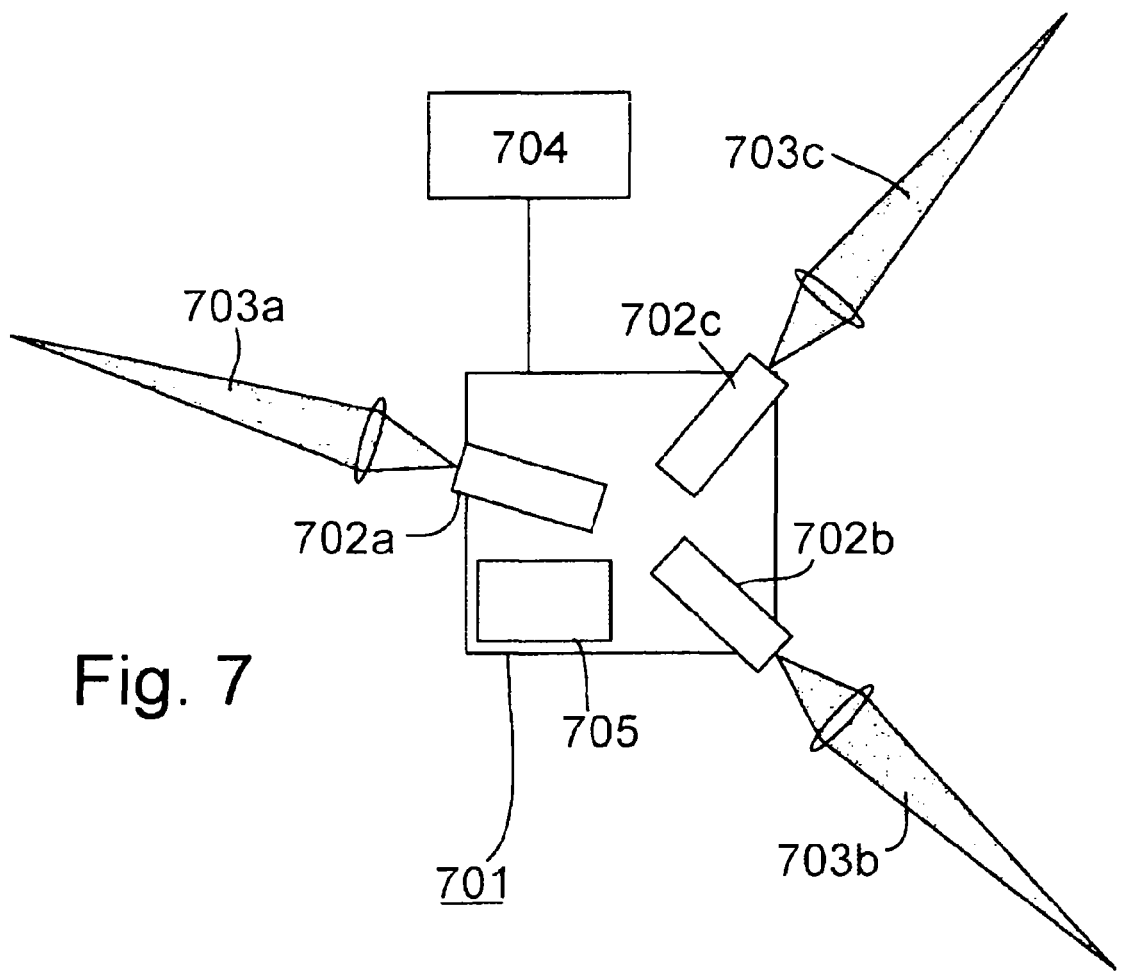
FIG. 7 is a schematic illustration of a sensor cluster in a configuration which permits measurement of distance

A further embodiment of the invention provides for the use of a sensor cluster 701 which is illustrated schematically in FIG. 7 and which is modified compared to the clusters previously described so that, in addition to the speed components in the direction of the measuring light beams 703 a, b, c, the distances which the measuring light beams 703 a, b, c travel between the sensor cluster 701 and the roadway surface 104 are also determined. The modified cluster 701 is referred to below as distance cluster, while the previously described sensor cluster 102 for measuring the speed is referred to below as a speed cluster in order to differentiate from the distance cluster. Like the speed cluster 102, the distance cluster 701 is mounted on the underfloor of the vehicle bodywork 105. It also comprises three laser units 702 a, b c which are connected to an evaluation device 704 and transmit measuring light beams 703 a, b c in various direction, which are reflected at the roadway surface 104. The laser units 703 a, b, c of the distance cluster 701 can basically be configured in the same way as the laser units 108 a, b, c of the speed cluster. However, in contrast to the speed cluster 102, the frequency of the light emitted by the laser units 702 a, b, c can be changed. The change is preferably brought about here by changing the current flowing through the laser diodes, and this is brought about by means of a control device 705. As in the case of the speed cluster 102, in the case of the distance cluster 701, light which is transmitted by a laser unit 702i is scattered at the roadway surface 104 and partially reflected back to the laser unit 702i. The reflected-back light is fed back into the resonator of the corresponding laser unit 702i and interferes, in the resonator of the laser unit 702i with the light generated there. This leads to the occurrence of a self-mixing effect in the resonator, which effect causes the intensity of the light transmitted by the laser diode to be modulated, and said modulation is detected with a photo diode. The modulation of the current of the photo diode has here a frequency which corresponds to the difference between the frequencies of the reflected-back laser light and the laser light in the resonator in so far as this differential frequency can be resolved by the photo diode.

Figure 8:
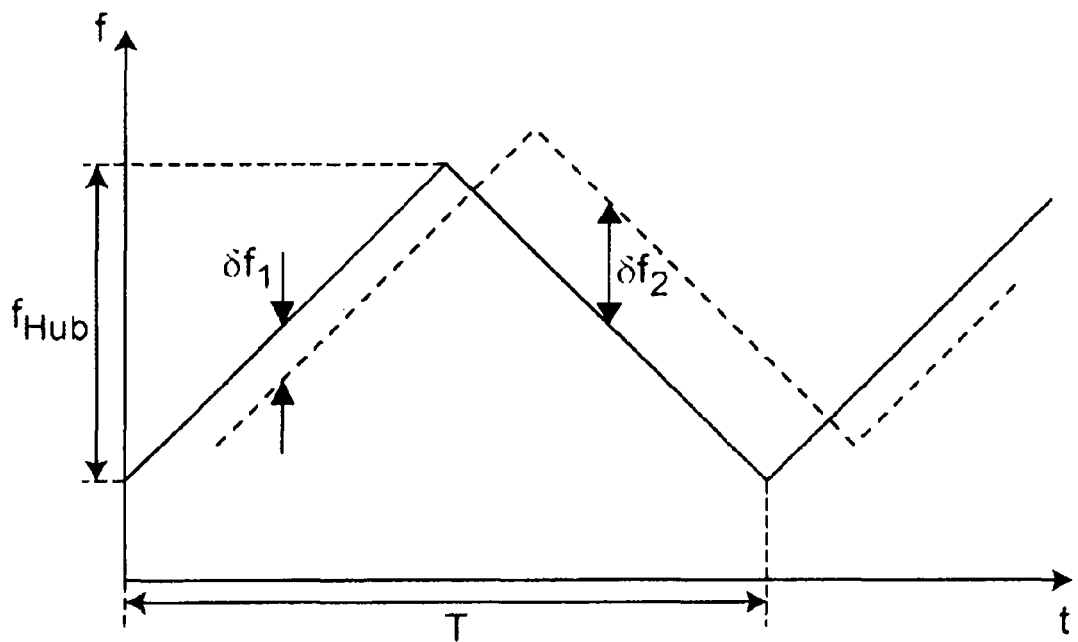
FIG. 8 shows a diagram with a basic illustration of the time profile of a modulated frequency of the light emitted by a laser unit.

The frequency of the transmitted laser light is modulated according to the FMCW (Frequency Modulated Continuous Wave) principle, which is known per se, in order to use a laser unit 702i of the distance cluster 701 to determine not only the speed component $\vec{v}_i$ but also the distance $d_{Li}$ which the respective measuring light beam 703i travels between the laser unit 702i or the resonator contained therein and the roadway surface. The frequency modulation is carried out by means of the control device 705 by correspondingly changing the current flowing through the laser diode. In one configuration, linear modulation according to a delta function is provided, as illustrated schematically in the diagram in FIG. 8 by means of the unbroken line. In the diagram, the frequency f is plotted against the time t. The frequency of the reflected-back signal whose time profile is illustrated in the diagram in FIG. 8 by means of the dashed line is shifted compared to the instantaneous frequency of the measuring light beam 703i. The frequency shift by $\delta f = f_R - f_T$ between the frequency $f_R$ of the reflected light and the frequency $f_T$ of the transmitted light comprises a first portion $f_\tau$ which results from the transit time of the reflected-back light, and a second portion $f_D$ which is due to the Doppler shift of the reflected-back light. When the frequency of the measuring light beam 703i increases, the frequency shift $\delta f_i$ results from the difference between the Doppler portion $f_D$ and the first portion $f_\tau$, so that the following applies:

$$\delta f_1 = f_D - f_\tau \quad (9)$$

When the frequency decreases, the frequency shift ($Y_2$ is obtained from the sum of the two portions, i.e. the following applies:

$$\delta f_2 = f_D + f_\tau \quad (10)$$

As a result, the two portions of the frequency shift can be obtained by evaluating the differential frequency during an increasing frequency and a decreasing frequency. In this context the following applies:

$$f_D = \frac{1}{2}(\delta f_2 + \delta f_1) \quad (11)$$

$$f_\tau = \frac{1}{2}(df_2 - \delta f_1) \quad (12)$$

The speed component $v_{Li}$ and the distance $d_{Li}$ can be obtained from the equations (11) and (12) by means of the laser unit 702i. For the speed component $v_{Li}$ the following applies here:

$$v_{Li} = -\frac{f_D \cdot \lambda}{2} \quad (13)$$

where λ denotes the wavelength of the emitted laser light, and the following applies for the distance $d_{Li}$:

$$d_{Li} = \frac{f_\tau \cdot c \cdot T}{4 \cdot f_{swing}} \quad (14)$$

where $f_{swing}$ denotes the frequency swing, i.e. the difference between the minimum and the maximum values of the modulated frequency, and T denotes the period length of the frequency modulation.

The distance cluster 102 can be used, as described above, to determine not only the distances $d_{Li}$ but also speeds $v_{Li}$. The speed components (i=a,b,c) which are obtained by means of the distance cluster 701 correspond to those which can also be determined by means of the speed cluster 102. For this reason, an individual sensor cluster 701 can be used to determine speeds $v_{Li}$ and distances $d_{Li}$.

However, it can also be provided that, instead of a single sensor cluster, a distance cluster 701 is used to determine these variables, with which distance cluster 701 the distances $d_{Li}$ are detected, and a separate speed cluster 102 of the previously described type is used to determine the speeds $v_{Li}$. The distance cluster 701 and the speed cluster 102 can be integrated in a common housing in this configuration. In addition, the two sensor clusters 701, 102 can have a common evaluation device 704.

The distance obtained by means of a laser unit 702i of the distance cluster 701 corresponds to the absolute value of a connecting vector $\vec{d}_{Li}$ between the distance cluster 701 and the point on the roadway surface 104 at which the corresponding measuring light beam 703 a, b, c impinges. The connecting vector is given by $\vec{d}_{Li} = d_{Li} \cdot \vec{n}_{Li}$, where the vector $\vec{n}_{Li}$ as given in equation (2), for the measuring light beams 103 a, b, $c$, which describes the directions of the measuring light beams 703 $a, b, c$. The three connecting vectors $\vec{d}_{La}$, $\vec{d}_{Lb}$ and $\vec{d}_{Lc}$ span a plane which corresponds to the plane of the roadway. The evaluation device 704 can therefore determine from the obtained distances $d_{La}$, $d_{Lb}$ and $d_{LC}$, in particular, the rotational angles between the x-y plane of the sensor coordinate system 401 and the plane of the roadway. These rotational angles correspond to the rolling angle and the pitching angle of the vehicle bodywork 105, since the plane of the roadway is oriented parallel to the x-y plane of the horizontalized coordinate system.

In one configuration, for example a unit normal vector of the plane which is spanned by the measuring light beams 703 $a, b, c$ can be determined in order to determine the rotational angles. Such a unit normal vector is obtained by using the vector product, for example, by means of $$\vec{H} = \frac{(\vec{d}_{Lb} - \vec{d}_{La}) \times (\vec{d}_{Lc} - \vec{d}_{La})}{\|(\vec{d}_{Lb} - \vec{d}_{La}) \times (\vec{d}_{Lc} - \vec{d}_{La})\|} \quad (15)$$

where $\|\cdot\|$ denotes the absolute value. The unit normal vector $\vec{H}$ corresponds to a unit vector of the horizontalized system in the z direction, given in the sensor coordinate system 401. Accordingly, the following applies:

$$\vec{e}_z = S_y(-\theta)S_x(-\phi)\vec{H} \quad (16)$$

In this equation, $\vec{e}_z = (0,0,1)^T$ denotes the unity vector in the z direction in the sensor coordinate system 401. The vector equation (16) comprises an equation system for determining the rolling angle $\phi$ and the pitching angle $\theta$ of the vehicle bodywork 105. By using $\vec{H} = (h_1, h_2, h_3)$ the following is obtained here as a solution:

$$\phi = \arctan\frac{h_2}{h_3} \quad (17)$$

$$\theta = \arctan\frac{h_1}{\sqrt{1 - h_1^2}} \quad (18)$$

In equation (18), the x component of $\vec{H}$ is to be inserted into the physical unit in which the normalization has been carried out for $\vec{H}$, which may have been done, for example in centimeters or meters.

Figure 9:
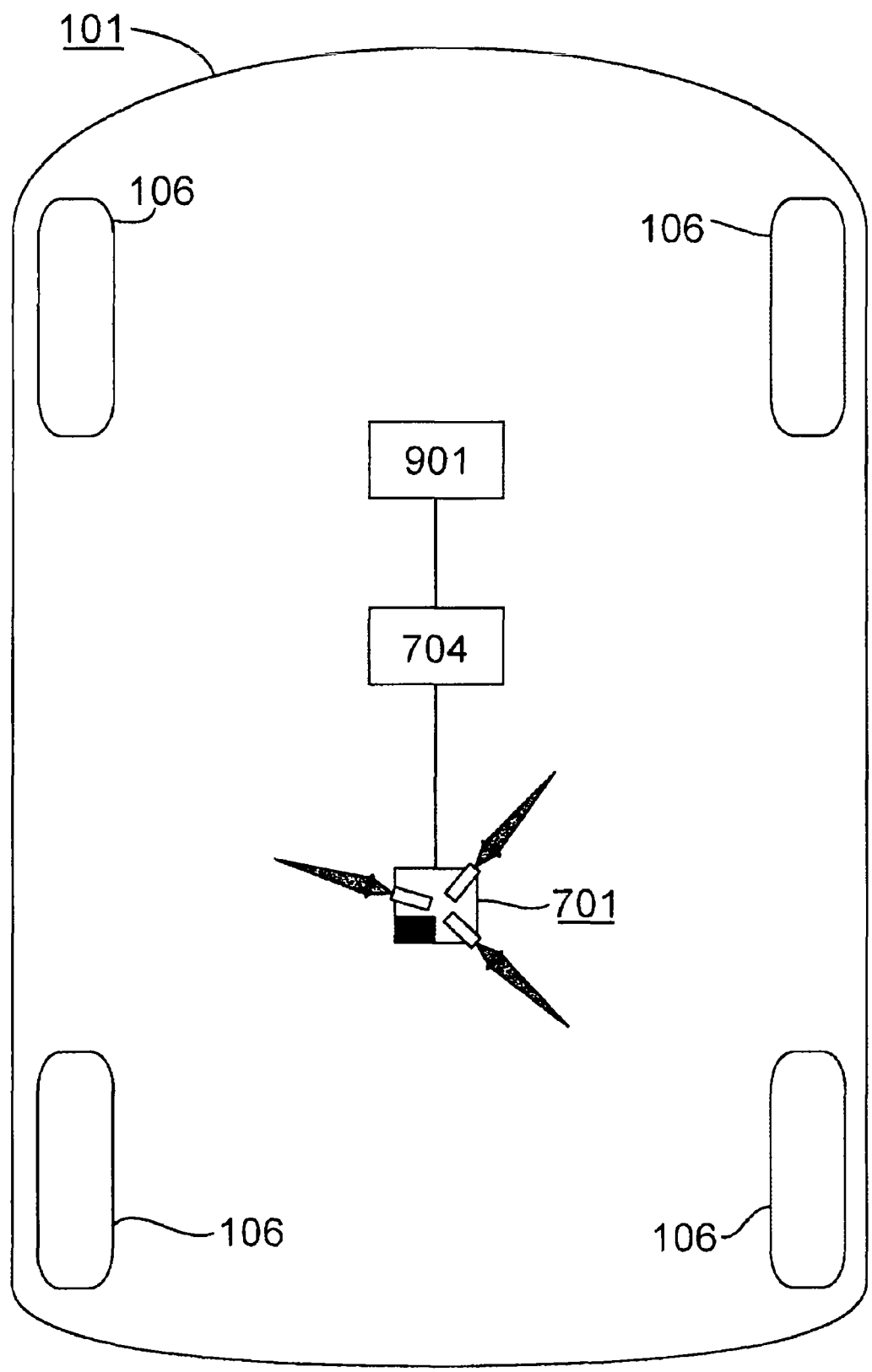
FIG. 9 is a schematic illustration of a motor vehicle having a sensor cluster and a rotation rate sensor.
Figure 10:
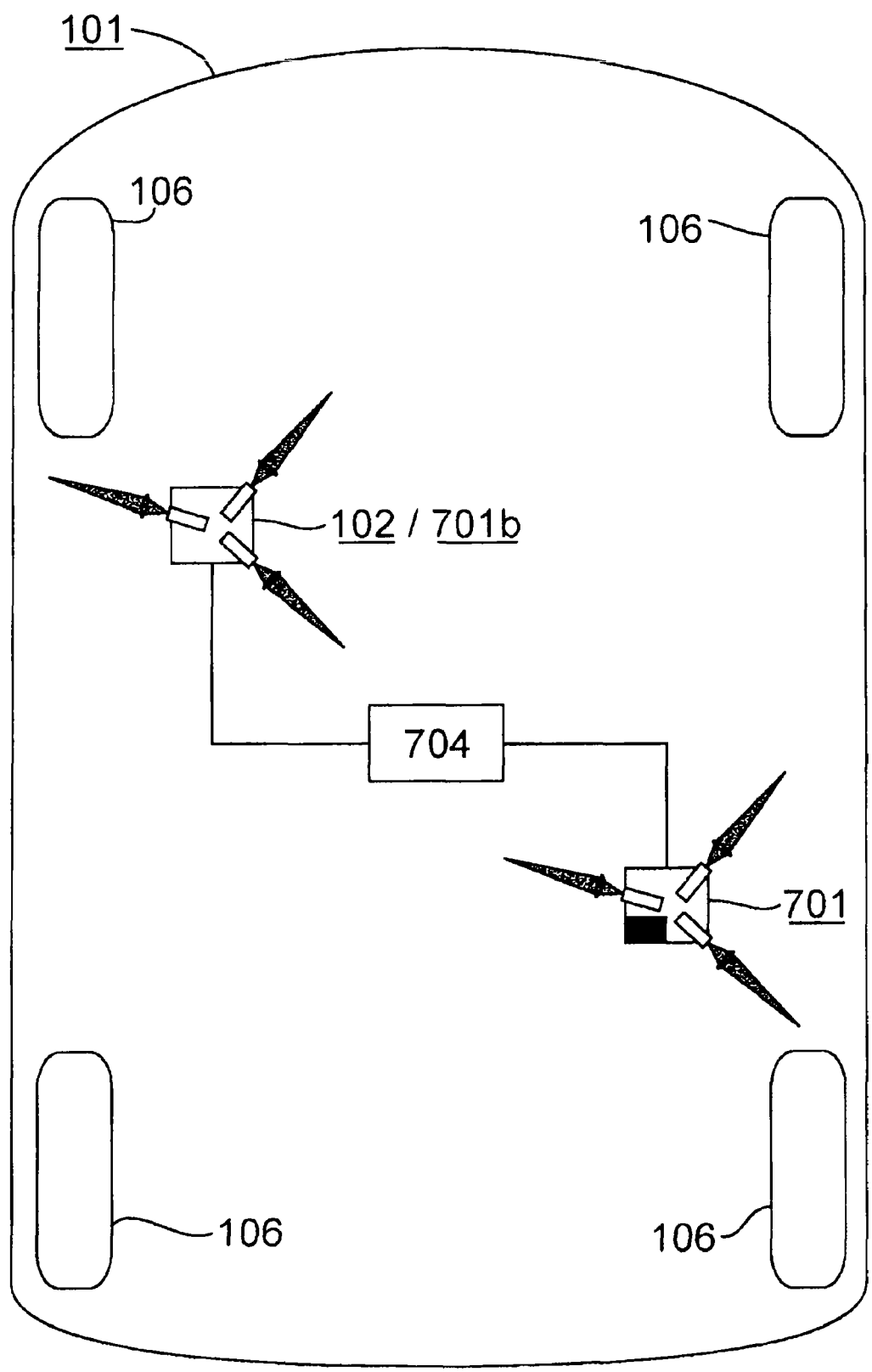
FIG. 10 is a schematic illustration of a motor vehicle having two sensor clusters in a further configuration.

After the evaluation device 704 has determined the rolling angle and the pitching angle of the vehicle 101 on the basis of the measurement signals of the distance cluster 701, the rolling rate and the pitching rate of the vehicle 101 are calculated by deriving the rolling angle and the pitching angle over time. In order to determine the speed of the center of gravity in the center of gravity system 402 or in the horizontalized system, knowledge of the yaw rate of the vehicle 101 is additionally necessary as well as the rolling rate and the pitching rate. This knowledge is detected by means of a yaw rate sensor 901 in a configuration which is illustrated schematically in FIG. 9 by means of a block diagram. In a further configuration, which is shown in FIG. 10 in a schematic block diagram, a further sensor cluster is used in addition to the distance cluster 701, which further sensor cluster is positioned at a distance from the distance cluster on the underfloor of the vehicle bodywork 105. The additionally used sensor cluster may be a further distance cluster 701$b$ or a speed cluster 102. By means of the additional sensor cluster, the speed of the sensor cluster is obtained so that two speeds are present: the speed $\vec{v}_{La}$ of the distance cluster 701 and the speed $\vec{v}_{Lb}$ of the additional sensor cluster. By using the rolling rate and/or the pitching rate of the vehicle 101, it is possible to calculate the yaw rate from these two equations in the way already described previously from the relationship $$\vec{v}_{La} - \vec{v}_{Lb} = \vec{\omega} \times \vec{r}_{dist} \quad (19)$$

where $\vec{r}_{dist}$ denotes the connecting vector from the distance cluster 701 to the additional sensor cluster.

On the basis of the rolling rate, the pitching rate and the yaw rate, the evaluation device 704 then calculates, from the speed $\vec{v}_{La}$ determined by means of the distance cluster 102 and/or from the speed $\vec{v}_{Lb}$ obtained by means of the additional sensor cluster, the speed $\vec{v}_{CM}$ of the center of gravity CM of the vehicle by using the relationship (4). On the basis of the rolling angle obtained by means of the distance cluster 701 and the obtained pitching angle it is possible, in a further step, to calculate the vehicle speed $\vec{v}_{CM}$ from the speed $\vec{v}_{CM}^h$ in the horizontalized system in the evaluation device 704. Output signals of the evaluation device 704 therefore constitute in this configuration the components of the vehicle speed $\vec{v}_{CM}^h$ in the horizontalized system, the rotation rates of the vehicle 101 and, if appropriate, the rotational angles of the vehicle 101.

The previously described sensor configurations have in common the fact that the evaluation device 110, 704 can determine either the vehicle speed $\vec{v}_{CM}$ in the centralized system or the speed $\vec{v}_{CM}$ of the vehicle 101 in the center of gravity system 402, which speed $\vec{v}_{CM}$ corresponds approximately to the speed $\vec{v}_{CM}^h$ in the horizontalized coordinate system. The obtained speed components can be used directly by further systems of the vehicle 101 such as, for example, driver information systems or control systems such as, for example, a vehicle movement dynamics control system. Furthermore, further vehicle movement dynamics variables can be derived from the obtained variables and can be used in further vehicle systems. In particular, the transverse acceleration of the vehicle 101 can be calculated from the vehicle transverse speed $v_{CM,y}^h$ by derivation over time, so that there is no need for an additional transverse acceleration sensor, which is a customary component of conventional vehicle movement dynamics control systems. Furthermore, the attitude angle $\beta$ of the vehicle 101 can be obtained from the longitudinal speed $v_{CM,x}^h$ and the transverse speed $v_{CM,y}^h$ of the vehicle, for which attitude angle $\beta$ the following applies:

$$\beta = \arctan\frac{v_{CM,y}}{v_{CM,x}} \quad (20)$$

The attitude angle is particularly suitable for characterizing the driving state, in particular in critical driving situations, and can therefore be used, for example by vehicle movement dynamics controllers to stabilize the vehicle 101. However, with a conventional sensor system the attitude angle cannot be reliably obtained, so that the execution of vehicle movement dynamics control processes on the basis of the present invention can be significantly improved by making the attitude angle available.

Furthermore, in a number of previously described configurations, the yaw rate, the rolling rate and the pitching rate of the vehicle 101 can be obtained. These variables can also be made available to further devices of the vehicle 101. Examples of these devices are once again vehicle movement dynamics controllers whose control algorithms can include these variables or chassis controllers and further driving assistance systems and passive safety systems which compensate, for example, rolling motions and/or pitching motions of the vehicle bodywork 105.

Although the invention has been described in detail in the drawings and the preceding illustration, the illustrations are to be understood as being illustrative or exemplary and not restrictive; in particular, the invention is not restricted to the exemplary embodiments explained. Further variants of the invention and their embodiments emerge for a person skilled in the art from the preceding disclosure, the figures and the patent claims. Terms used in the patent claims such as "comprise", "have", "include", "contain" and the like do not preclude further elements or steps. The use of the indefinite article does not preclude a plurality. An individual device can execute the functions of a plurality of units or devices which are specified in the patent claims.

The invention claimed is:

1. A sensor device arranged on a motor vehicle for detecting a motion state of the motor vehicle comprising:
    at least two laser clusters arranged on at least two axes with respect to a longitudinal or transverse axis of the vehicle, each cluster having a plurality of light sources for emitting coherent light which is transmitted in a direction of a roadway surface, and a plurality of respective interference detectors, each respective interference detector detecting a measurement variable based on interference between light scattered at the roadway surface and the light emitted by the respective light sources, and
    an evaluation device which is configured to characterize a motion state of the vehicle by computing:
        at least two vehicle rotation variables based on each respective measurement variable, the at least two rotation variables indicate a rotation of the vehicle and are selected from the group consisting of yaw rate of the vehicle, roll rate of the vehicle and pitch rate of the vehicle.

2. The sensor device as claimed in claim 1 further comprising at least one sensor cluster having a plurality of laser units which are coupled to the evaluation device, wherein the laser units emit light in various direction.

3. The sensor device as claimed in claim 2, wherein the laser units of the sensor cluster are arranged in a common housing which can be mounted on an underside of a bodywork of a vehicle, which underside faces the roadway surface when the motor vehicle is operating.

4. The sensor device as claimed in claim 2, wherein the evaluation device is configured to obtain a speed component of the sensor cluster from each of the measurement variables detected by the laser units of the sensor cluster, and to determine at least one speed component of the motor vehicle on a basis of obtained speed components.

5. The sensor device as claimed in claim 4, wherein the evaluation device is configured to use at least one rotation rate of the motor vehicle in determining the speed component of the motor vehicle.

6. The sensor device as claimed in claim 1 further comprising two sensor clusters which are coupled to the evaluation device, and at least one device which is coupled to the sensor device and is configured to determine a first rotation rate, wherein the evaluation device is configured to determine at least one speed component of the motor vehicle and/or a second rotation rate from measurement variables detected in the sensor clusters and the first rotation rate detected by the at least one device.

7. The sensor device as claimed in claim 6, wherein the at least one device for determining the first rotation rate is a rotation rate sensor.

8. The sensor device as claimed in claim 7, wherein the at least one device is a yaw rate sensor.

9. The sensor device as claimed in claim 1 further comprising three sensor clusters which are coupled to the evaluation device, wherein the evaluation device is configured to determine, from the measurement variables obtained with the three sensor clusters, at least one speed component of the motor vehicle and/or at least one rotation rate of the vehicle.

10. The sensor device as claimed in claim 1 further comprising a first sensor cluster having a plurality of laser units, wherein frequencies of light emitted by the laser units can be modulated according to a modulation schema in such a way that, in each case, a distance can be obtained from a detected measurement variable in the evaluation device, wherein the evaluation device is configured to determine at least one rotational angle and/or at least one rotation rate of the vehicle from the obtained distances.

11. The sensor device as claimed in claim 10 wherein the first sensor cluster includes three laser units.

12. The sensor device as claimed in claim 10, wherein frequencies of the light emitted by the laser units can be modulated according to a modulation schema in such a way that, in addition to the distance, in each case, a speed component of the first sensor cluster can be obtained from the detected measurement variable.

13. The sensor device as claimed in claim 12, wherein the evaluation device is configured to determine at least one speed component of the motor vehicle from the speed components obtained with the first sensor cluster and the rotation rate.

14. The sensor device as claimed in claim 13, wherein the evaluation device is configured to use, for obtaining the speed component of the motor vehicle, a further rotation rate which is obtained by a rotation rate sensor.

15. The sensor device as claimed in claim 13 further comprising a second sensor cluster which is connected to the evaluation device, wherein speed components of the second sensor cluster can be obtained from the measurement variable detected in the second sensor cluster, wherein the evaluation device is configured to obtain at least one further rotation rate of the vehicle from the obtained speed components of the first and second sensor clusters, and to use the further rotation rate to obtain the speed component of the motor vehicle.

16. A motor vehicle comprising a sensor device as claimed in claim 1.

17. A method for detecting a motion state of a motor vehicle having a sensor device arranged on the motor vehicle, said method comprising the steps of:
    transmitting coherent light in a direction of a roadway surface from a plurality of light sources for each of at least two laser clusters arranged on at least two axes with respect to a longitudinal or transverse axis of the vehicle;

detecting, by a plurality of respective interference detectors, a measurement variable based on interference between light scattered at the roadway surface and the light emitted by the respective light sources, and characterizing, by an evaluation device, a motion state of the vehicle by computing at least two vehicle rotation variables based on each respective measurement variable, the at least two rotation variables indicate a rotation of the vehicle and are selected from the group consisting of yaw rate of the vehicle, roll rate of the vehicle and pitch rate of the vehicle.

\* \* \* \* \*

UNITED STATES PATENT AND TRADEMARK OFFICE
CERTIFICATE OF CORRECTION

PATENT NO. : 8,363,211 B2  Page 1 of 1
APPLICATION NO. : 12/678403
DATED : January 29, 2013
INVENTOR(S) : Groitzsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 225 days.

Signed and Sealed this
First Day of September, 2015

Michelle K. Lee
*Director of the United States Patent and Trademark Office*